United States Patent
Bulatow et al.

(10) Patent No.: US 9,685,833 B2
(45) Date of Patent: Jun. 20, 2017

(54) ROTOR FOR A ROTATING ELECTRIC MACHINE AND ELECTRIC MOTOR

(71) Applicant: Continental Automotive GmbH, Hannover (DE)

(72) Inventors: Michael Bulatow, Berlin (DE); Knut Welke, Falkensee (DE)

(73) Assignee: CONTINENTAL AUTOMOTIVE GMBH, Hanover (DE)

( * ) Notice: Subject to any disclaimer, the term of this patent is extended or adjusted under 35 U.S.C. 154(b) by 373 days.

(21) Appl. No.: 14/373,503

(22) PCT Filed: Jan. 22, 2013

(86) PCT No.: PCT/EP2013/051085
§ 371 (c)(1),
(2) Date: Jul. 21, 2014

(87) PCT Pub. No.: WO2013/110580
PCT Pub. Date: Aug. 1, 2013

(65) Prior Publication Data
US 2015/0076935 A1 Mar. 19, 2015

(30) Foreign Application Priority Data
Jan. 26, 2012 (DE) .................. 20 2012 000 842 U

(51) Int. Cl.
*H02K 15/12* (2006.01)
*H02K 3/34* (2006.01)
*H02K 3/487* (2006.01)

(52) U.S. Cl.
CPC .............. *H02K 3/34* (2013.01); *H02K 3/487* (2013.01); *H02K 15/12* (2013.01)

(58) Field of Classification Search
CPC ........... H02K 15/12; H02K 3/48; H02K 55/04
USPC ............................................ 310/43, 214–215
See application file for complete search history.

(56) References Cited

U.S. PATENT DOCUMENTS

| 3,008,786 A | * | 11/1961 | Costello ................. H02K 3/527 |
| | | | 310/214 |
| 3,311,511 A | | 3/1967 | Goller .......................... 148/597 |
| 3,480,810 A | | 11/1969 | Potter ............................. 310/54 |
| 3,991,152 A | | 11/1976 | Santi et al. .................... 264/161 |
| 4,147,946 A | | 4/1979 | Linscott, Jr. et al. ........ 310/214 |

(Continued)

FOREIGN PATENT DOCUMENTS

| CH | 203736 A | 3/1939 | ............... H02K 3/51 |
| CH | 620060 A5 | 10/1980 | ............. H02K 3/487 |

(Continued)

OTHER PUBLICATIONS

Chinese Office Action, Application No. 201380006876.0, 12 pages, Aug. 17, 2016.

(Continued)

*Primary Examiner* — Thanh Lam
(74) *Attorney, Agent, or Firm* — Slayden Grubert Beard PLLC

(57) ABSTRACT

A rotor for a rotating electrical machine may include a number of pole teeth which carry a field winding, slots formed between the pole teeth, slot wedges provided in the slots, and separators arranged in the slots, the separators extending, starting from the slot wedges, between the windings in a direction toward a slot base.

20 Claims, 2 Drawing Sheets

(56) References Cited

U.S. PATENT DOCUMENTS

| | | | |
|---|---|---|---|
| 4,149,101 A | 4/1979 | Lesokhin et al. | 310/214 |
| 4,413,405 A * | 11/1983 | Doke | H02K 15/0018 |
| | | | 29/596 |
| 4,933,583 A | 6/1990 | Ripplinger | 310/156.22 |
| 5,036,238 A | 7/1991 | Tajima | 310/214 |
| 5,127,148 A | 7/1992 | Lykes et al. | 29/596 |
| 5,498,916 A | 3/1996 | Lindner et al. | 310/214 |
| 5,684,352 A | 11/1997 | Mita et al. | 310/456.56 |
| 5,838,080 A | 11/1998 | Couderchon et al. | 310/49.33 |
| 5,973,432 A | 10/1999 | Katagiri et al. | 310/214 |
| 6,190,465 B1 | 2/2001 | Coutu et al. | 148/315 |
| 6,222,286 B1 | 4/2001 | Watanabe et al. | 310/49.36 |
| 6,225,723 B1 * | 5/2001 | Cooper | H02K 1/24 |
| | | | 310/214 |
| 6,350,324 B1 | 2/2002 | Waeckerle et al. | 148/311 |
| 6,759,771 B2 | 7/2004 | Doherty et al. | 310/58 |
| 6,933,648 B2 * | 8/2005 | Buchan | H02K 3/527 |
| | | | 242/433 |
| 7,687,963 B2 | 3/2010 | Klaussner | 310/214 |
| 7,743,498 B2 | 6/2010 | Rhodes | 29/888.3 |
| 7,875,132 B2 | 1/2011 | Pandey | 148/415 |
| 8,237,318 B2 | 8/2012 | Ikitake et al. | 310/68 B |
| 8,536,746 B2 | 9/2013 | Kuhnen et al. | 310/72 |
| 8,729,887 B2 | 5/2014 | Suzuki et al. | 324/207.16 |
| 2003/0184180 A1 | 10/2003 | Doherty et al. | 310/214 |
| 2003/0193256 A1 | 10/2003 | Liebermann | 310/194 |
| 2005/0212373 A1 * | 9/2005 | McDowall | H02K 3/527 |
| | | | 310/214 |
| 2007/0120429 A1 | 5/2007 | Howard et al. | 310/61 |
| 2008/0238237 A1 | 10/2008 | Nishihama et al. | 310/166 |
| 2010/0041939 A1 | 2/2010 | Siess | 600/16 |
| 2010/0102910 A1 | 4/2010 | Waeckerle et al. | 335/297 |
| 2010/0141056 A1 | 6/2010 | Miyahara et al. | 310/30 |
| 2013/0147307 A1 * | 6/2013 | Morooka | H02K 3/40 |
| | | | 310/215 |

FOREIGN PATENT DOCUMENTS

| | | | |
|---|---|---|---|
| CN | 1220050 A | 6/1999 | H01F 27/28 |
| CN | 1873035 A | 12/2006 | B22D 21/00 |
| CN | 101031744 A | 9/2007 | F16J 15/32 |
| CN | 101680070 A | 3/2010 | C22C 19/00 |
| CN | 102055295 A | 5/2011 | H02K 11/00 |
| DE | 1925625 A1 | 3/1970 | H02K 9/19 |
| DE | 2817951 A1 | 12/1978 | H02K 1/24 |
| DE | 3808311 A1 | 9/1989 | H02K 1/27 |
| DE | 3901230 C1 | 7/1990 | H02K 15/12 |
| DE | 19623460 A1 | 12/1997 | H02K 15/14 |
| DE | 69904367 T2 | 10/2003 | C21D 6/00 |
| DE | 19808659 B4 | 3/2004 | H02K 15/12 |
| DE | 69721671 T2 | 3/2004 | C22C 38/00 |
| DE | 10244201 A1 | 4/2004 | H02K 15/00 |
| DE | 60010167 T2 | 8/2005 | C22C 30/00 |
| DE | 102005030877 A1 | 1/2007 | H02K 3/487 |
| DE | 602004005631 T2 | 12/2007 | H02K 3/487 |
| DE | 102007014224 A1 | 9/2008 | A61M 1/00 |
| DE | 202009008646 U1 | 11/2010 | H02K 11/00 |
| DE | 102009023691 A1 | 12/2010 | G01B 7/30 |
| DE | 112009000845 T5 | 4/2011 | H02K 11/00 |
| DE | 102009046716 A1 | 5/2011 | H02K 1/27 |
| DE | 102009051979 A1 | 6/2011 | H02K 11/00 |
| EP | 0543280 B1 | 5/1993 | H02K 3/487 |
| EP | 0562534 A1 | 9/1993 | H02K 1/06 |
| EP | 0889488 A1 | 1/1999 | C21D 6/00 |
| EP | 1005135 A1 | 5/2000 | H02K 1/24 |
| EP | 1967289 A2 | 9/2008 | B05D 7/14 |
| EP | 2113988 A1 | 11/2009 | H02K 15/16 |
| EP | 2296256 A2 | 3/2011 | H02K 3/52 |
| GB | 2339798 A | 2/2000 | H01F 1/147 |
| JP | 9322457 A | 12/1997 | H02K 3/487 |
| JP | 2002112488 A | 4/2002 | H02K 21/14 |
| WO | 2013/110580 A1 | 8/2013 | H02K 3/487 |
| WO | 2013/110652 A1 | 8/2013 | H02K 11/00 |
| WO | 2013/110656 A1 | 8/2013 | H02K 3/487 |

OTHER PUBLICATIONS

Chinese Office Action, Application No. 201380006877.5, 13 pages, Feb. 3, 2016.
Chinese Office Action, Application No. 201380006878.X, 14 pages, May 20, 2016.
International Search Report and Written Opinion, Application No. PCT/EP2013/051231, 12 pages, Jun. 3, 2013.
International Search Report and Written Opinion, Application No. PCT/EP2013/051235, 11 pages, Jun. 3, 2013.
International Search Report and Written Opinion, Application No. PCT/EP2013/051085, 11 pages, Jun. 4, 2013.
Chinese Office Action, Application No. 201380006876.0, 12 pages, Feb. 16, 2016.
U.S. Notice of Allowance, U.S. Appl. No. 14/373,605, 33 pages, Dec. 27, 2016.
U.S. Non-Final Office Action, U.S. Appl. No. 14/373,577, 26 pages, Dec. 30, 2016.
Chinese Office Action, Application No. 201380006876.0, 12 pages, Jan. 25, 2017.
Chinese Office Action, Application No. 201380006878.X, 13 pages, Jan. 25, 2017.

* cited by examiner

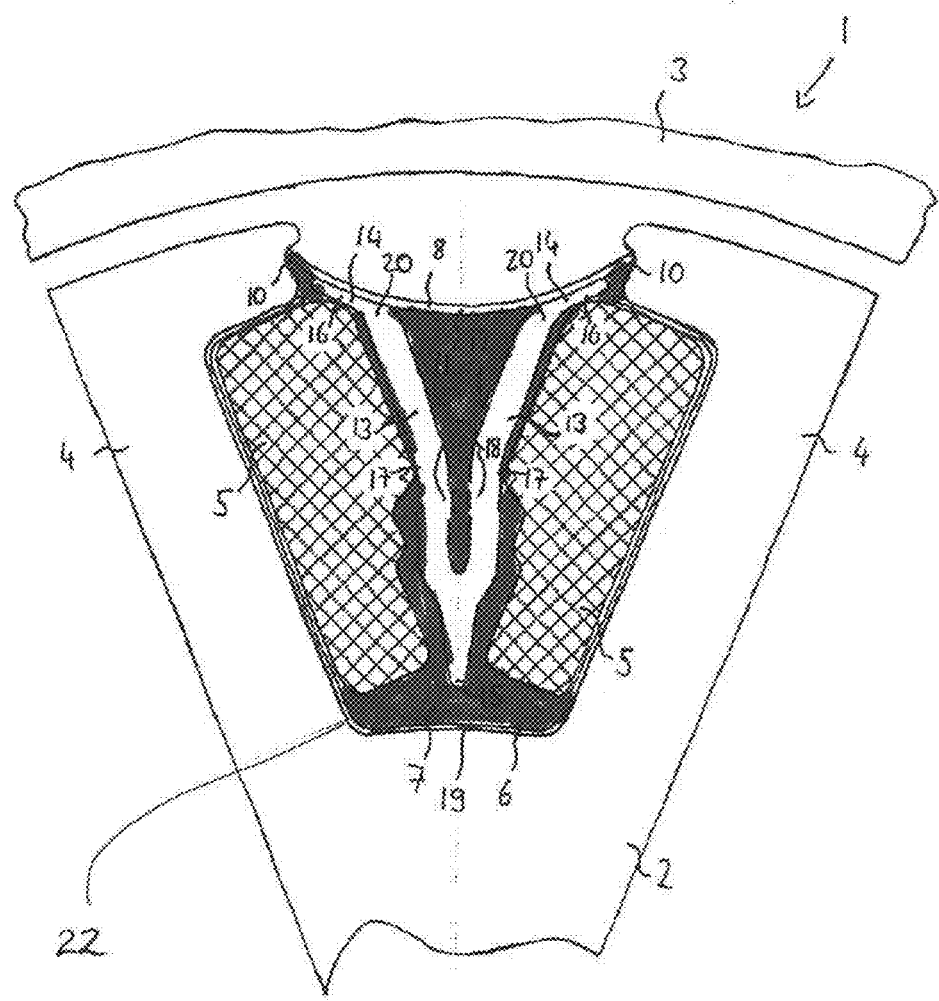

ROTOR FOR A ROTATING ELECTRIC MACHINE AND ELECTRIC MOTOR

CROSS-REFERENCE TO RELATED APPLICATIONS

This application is a U.S. National Stage Application of International Application No. PCT/EP2013/051085 filed Jan. 22, 2013, which designates the United States of America, and claims priority to DE Application No. 10 2012 000 842.0 filed Jan. 26, 2012, the contents of which are hereby incorporated by reference in their entirety.

TECHNICAL FIELD

The present invention relates to a rotor for a rotating electric machine, in particular for an electric motor or a generator, and to an electric motor comprising such a rotor.

BACKGROUND

Electric motors and drive motors are increasingly constructed in modern motor vehicles. In this case, sometimes separately excited synchronous machines are used which have a rotor comprising a laminate stack provided with a field winding. In the case of such rotors, the individual pole teeth are separated from one another by slots. The field winding is accommodated in the slots.

During operation, very high centrifugal forces occur both in the case of internal rotors and in the case of external rotors, and these centrifugal forces can draw the field winding out of the slots. The centrifugal forces are dependent on the speed and on the weight of the slot-internal components. In particular in the case of high-speed machines, the winding is therefore secured after fitting. Various binders are known for this purpose which are used as impregnating resins or potting compounds. The potting of cavities in the rotor for reinforcing purposes is also known for permanent magnet rotors, for example from DE 10 2009 046 716 A1.

In addition, slot stoppers or slot wedges are sometimes used in order to prevent the winding from being withdrawn from the slot. In the case of rotors designed for electric motors with a very high speed (10 000 revolutions per minute or more), it would be desirable to secure the slot-internal components, in particular the field winding, even more effectively with respect to centrifugal forces occurring during operation.

SUMMARY

One embodiment provides a rotor for a rotating electric machine, said rotor including a number of pole teeth bearing a field winding; in each case slots are formed between the pole teeth; slot wedges are provided in the slots; in addition separators are arranged in the slots, which separators extend starting from the slot wedges between the windings in the direction of a slot base.

In a further embodiment, the separators are formed from a non-magnetizable, electrically insulating material.

In a further embodiment, the separators are formed from a plastic.

In a further embodiment, the separators are V-shaped in cross section.

In a further embodiment, the separators are under pre-stress and press against the field windings in at least one contact-pressure region.

In a further embodiment, the separator is arranged in the region of the slot wedge between the slot wedge and the field windings and electrically insulates said slot wedge and said field windings from one another.

In a further embodiment, the field winding is surrounded by a potting compound.

In a further embodiment, the potting compound also fills an inner region formed between the slot wedge and limbs of the separator.

In a further embodiment, an inner region formed between the slot wedge and the limbs of the separator is kept free of potting compound.

In a further embodiment, the field winding is surrounded by an impregnating compound.

Another embodiment provides an electric motor comprising a rotor as disclosed above.

BRIEF DESCRIPTION OF THE DRAWINGS

Example aspects of the invention are described below with reference to FIGS. 1 and 2, which show a cross section through an electric motor.

DETAILED DESCRIPTION

Figure 1:
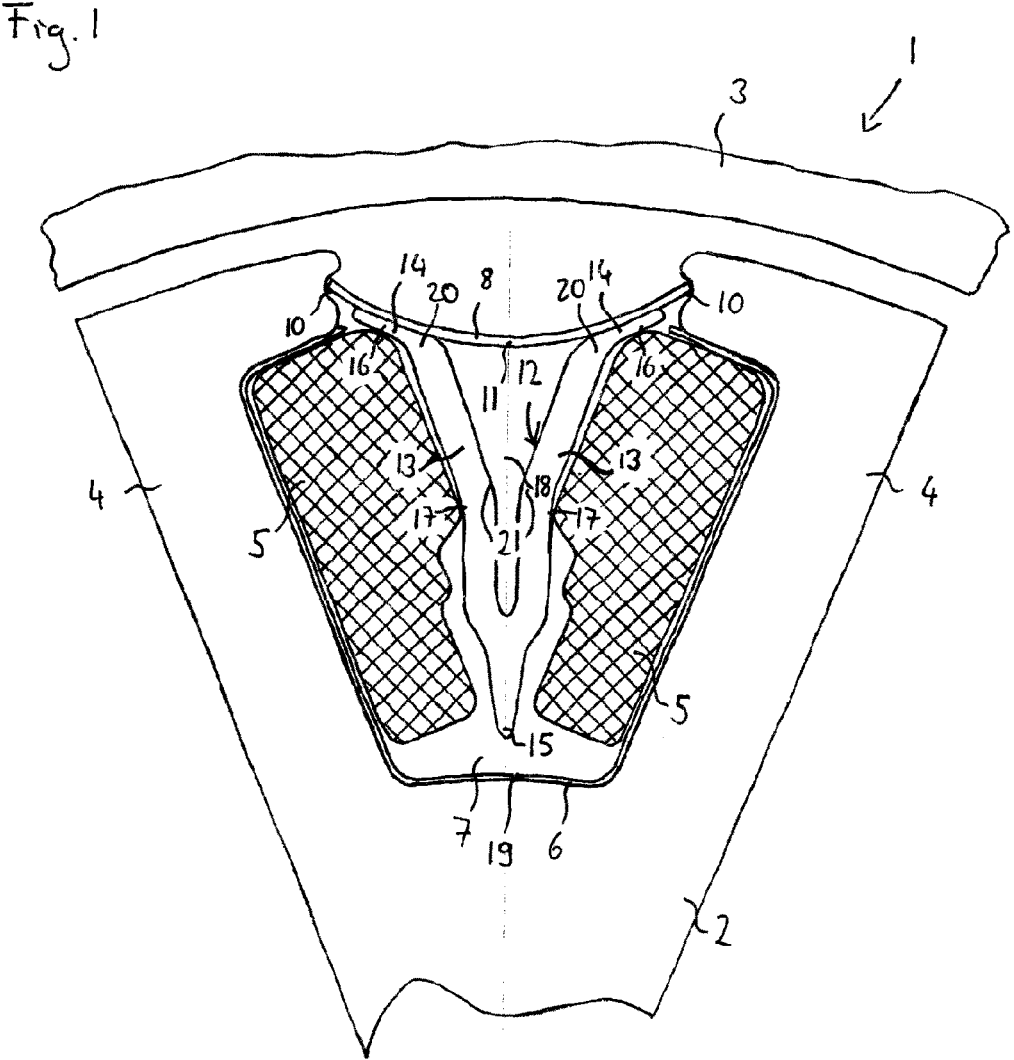

Embodiments of the invention provide a rotor for a rotating electric machine having a field winding which is fixed with respect to centrifugal forces in such a way that the rotor can also be used for very high speeds.

One embodiment provides a rotor for a rotating electric machine is specified which has a number of pole teeth bearing a field winding. In each case slots are formed between the pole teeth and slot wedges are provided in the slots. In addition, separators are arranged in the slots, which separators extend starting from the slot wedges between the windings in the direction of a slot base.

The separators have the task, inter alia, of keeping a minimum electrical distance between adjacent wound pole teeth. However, they also additionally secure the slot-internal components since they dissipate centrifugal forces occurring efficiently. The slot wedges contribute to the stabilization of the slot-internal components. In addition, the slot interior can be potted with a potting compound. Furthermore, however, separators are also provided and formed in such a way that they likewise contribute to the stabilization of the slot-internal components by virtue of dissipating the centrifugal forces arising during operation in a favorable manner. Such a rotor is also suitable for very high speeds of 10 000 revolutions per minute or more.

The centrifugal forces occurring during operation are generally asymmetrical since the adjacent pole teeth cannot be wound absolutely identically. In addition, in the case of impregnated or potted rotors, particularly high centrifugal forces occur owing to the increased weight. The separator extending starting from the slot wedge between the windings in the direction of the slot base divides the slot internal region into at least two regions, and given corresponding shaping of the separator also into three or more regions, and dissipates the forces occurring in the individual regions in a targeted manner.

A material which is electrically insulating and non-magnetizable is selected for the separator. In one embodiment, the separator is formed from a plastic, in particular as a component part injection-molded from plastic.

In one embodiment, the separator is V-shaped in cross section. In this case, the point of the V points towards the slot base, and the two limbs of the V can be connected at their ends to the slot wedge or be supported on said slot wedge.

In the case of a separator with such a formation, the slot internal region is divided into three subregions: the two regions outside the limbs of the separator and the region enclosed by the limbs. The centrifugal forces occurring in the two outer regions are typically approximately equal in magnitude. They can be dissipated via the two limbs of the separator in peripheral regions of the slot wedge. In these peripheral regions, the slot wedge is supported on the pole teeth and can therefore be subjected to a comparatively high load. Forces acting there do not result in bending or loosening of the slot wedges, therefore. In the third region enclosed by the limbs, notable centrifugal forces only occur when said region is filled with potting compound. These centrifugal forces then act directly on the slot wedge. Since in this case only the comparatively low centrifugal forces caused by the wedge including potting compound in the interior of the separator take effect, however, the slot wedge is relieved of load to a marked extent in comparison with an arrangement without a separator.

The shape of the separator therefore reduces the centrifugal forces acting on the particularly critical central region of the slot wedge by virtue of it dissipating a considerable proportion of these forces into the peripheral regions of the slot wedge.

In one embodiment, the separator is under prestress and presses against the windings in at least one contact-pressure region. Owing to the prestress, the windings of the pole teeth are pressed against the rotor laminate stack. As a result, electromagnetic losses are reduced.

In one embodiment, the separator is arranged in the region of the slot wedge between the slot wedge and the windings and insulates said slot wedge and said windings from one another.

In one embodiment, the field winding is surrounded by a potting compound. For this purpose, once the rotor has been fitted, once the windings have been applied and the slot wedges and separators have been fitted, the electrically insulating potting compound, for example a potting resin or epoxy resin such as Araldite or a plastic, is introduced into the cavities within the slots of the rotor and cures. In one embodiment, the cavities within the slots are potted substantially completely with a potting compound.

In the case of such rotors, the slot-internal components, in particular the field winding, are secured particularly well in respect of centrifugal forces occurring during operation.

In one embodiment, the potting compound also fills an inner region formed between the slot wedge and the limbs of the separator. In the case of such a rotor, the centrifugal forces acting on the slot wedge are slightly higher owing to the slightly larger rotating mass. However, during potting the inner region of the separator does not need to be sealed off. Alternatively, the inner region formed between the slot wedge and the limbs of the separator can be kept free of potting compound.

Alternatively, the field winding can also be surrounded by an impregnating compound, for example an impregnating resin. During impregnation, the rotor is immersed in the impregnating compound and then dried. In this case, all of the slot components are adhesively bonded to one another, and the rest of the impregnating compound drips off. The rotor slots are in this case typically not completely filled.

In some embodiments, an electric motor comprising the described rotor can be a separately excited synchronous machine. It can be formed both as an internal rotor and as an external rotor.

Since the slot-internal components are secured effectively against destruction owing to centrifugal forces occurring, the electric motor can be designed for speeds of more than 10 000 revolutions per minute.

Such electric motors are suitable for use in a motor vehicle. They can be used both as drive motors which are fully integrated in the drive train and, for example, as starter generators or axle-hung motors. In one embodiment, therefore, a motor vehicle is specified comprising a drive which has the described electric motor. The motor vehicle can in this case be in the form of an electric or hybrid vehicle.

FIG. 1 shows, schematically, a cross section through an electric motor 1 in accordance with one embodiment comprising a rotor 2 in the form of a laminate stack and a stator 3 surrounding the rotor 2.

The rotor 2 has a number of pole teeth 4 which are separated from one another by slots 7. The pole teeth 4 bear field windings 5, which are electrically insulated from the rotor laminate stack by a slot insulation paper 6. The insulation can also be provided differently, for example by means of encapsulation by injection molding with a plastic.

The slot 7 is sealed off towards the outside by a slot wedge 8. The slot wedge 8 is formed from a non-magnetizable material, for example a steel.

The slot wedges 8 in this embodiment are formed from a material which substantially comprises the alloy composition $Fe_{remainder}Cr_aNi_bMn_cC_dSi_eP_fS_gN_h$, where a, b, c, d, e, f, g, and h are given in atomic percent and $18 \le a \le 19$; $12 \le b \le 13$; $0 \le c \le 1.4$; $0 \le d \le 0.055$; $0 \le e \le 0.6$; $0 \le f \le 0.04$; $0 \le g \le 0.008$, and $0 \le h \le 0.1$. In addition, the material can have manufacturing-typical impurities with other substances.

In comparison with known "Nirosta" steels, the material used for the slot wedges 8 has a particularly high content of chromium and nickel. As has been established, workpieces formed of this steel remain non-magnetizable even after reshaping, stamping or cutting.

In the embodiment shown, the slot wedge 8 has a concave shape with a curvature 11 towards the interior of the rotor 2. With its peripheral regions, the slot wedge 8 is accommodated and held in cutouts 10 in the pole teeth 4.

The slot wedge 8 secures the slot-internal components, in particular the field windings 5, in the slot 7 even at high speeds of the electric motor 1.

For improved distribution and dissipation of the centrifugal forces occurring during operation, a separator 12 in the form of a plastic injection-molded part, for example, is provided. The separator 12 is V-shaped in cross section and has two limbs 13, which extend from an outer region 14 between the slot wedge 8 and the windings 5 up to an end region 15 in the vicinity of the slot base 19, with said limbs combining at said end region. The inner region 18 is formed within the limbs 13.

The separators 12 are inserted into the slots 7 after winding of the laminate stack. In order to avoid damage to the field windings 5 or their insulation, the separators 12 are produced in such a way that they do not have any sharp ridges or tips.

The slot wedge 8 and the separator 12 extend in the slots 7 substantially over the entire length of the rotor 2. It is conventional to bevel the slots in order to reduce the cogging torque of the electric motor, for example. The separators 12 are suitable both for rotors with a beveled slot and for rotors with a straight slot.

The separator 12 is comparatively thin in the outer region 14 in order not to unnecessarily reduce the slot space factor (copper area per slot area). In this region, it insulates the slot wedge 8 from the windings 5.

The separator 12 is fitted with a prestress and has a first contact-pressure region 16 in its outer region 14 and, slightly further inwards, a second contact-pressure region 17, in which it presses the windings 5 against the pole teeth 4.

In addition, the limbs 13 are not straight, but rather the separator 12 has first and second curved regions 20, 21. Owing to these rounded portions, peak voltages are avoided at the separators 12. The curvature in the first curved regions 20 furthermore also has the function of reducing the touching area between the separator 12 and the slot wedge 8 in the central region of the slot wedge 8 which can be subjected to a lesser load. As a result, the region in which the separator 12 introduces forces into the slot wedge 8 is shifted further outwards.

In embodiments which are not shown, a greater or smaller number of contact-pressure regions can also be provided.

In order to secure the field winding 5, the slot 7 is filled substantially completely with a potting compound 22 (not illustrated for reasons of clarity in FIG. 1). FIG. 2 shows slot 7 filled substantially completely with potting compound 22.

The separator 12 can be fitted together with the slot wedge 8 axially or radially into the slot 7 provided with the winding 5 under prestress.

During operation of the electric motor 1, centrifugal forces occur. The separator 12 displaces these centrifugal forces over its outer region 14 to the peripheral region of the slot wedge 8. In its peripheral region, the slot wedge 8 is clamped in the cutouts 10 and can be subjected to a particularly high load. Here, higher forces can thus be introduced without the slot wedge 8 being overloaded and damaged or pushed out of the slot 7.

Although at least one exemplary embodiment has been demonstrated in the description above, various amendments and modifications can be performed. The mentioned embodiments are merely examples and are not intended to restrict the scope of validity, the applicability or the configuration in any way. Rather, the description above provides a person skilled in the art with a plan for implementing at least one exemplary embodiment, wherein numerous amendments in terms of the function and arrangement of elements described in an exemplary embodiment can be made without departing from the scope of protection of the attached claims and their legal equivalents.

LIST OF REFERENCE SYMBOLS

1 Electric motor
2 Rotor
3 Stator
4 Pole tooth
5 Field winding
6 Slot insulation paper
7 Slot
8 Slot wedge
10 Cutout
11 Central curvature
12 Separator
13 Limb
14 Outer region
15 End region
16 Contact-pressure region
17 Contact-pressure region
18 Inner region
19 Slot base
20 Curved region
21 Curved region

What is claimed is:

1. A rotor for a rotating electric machine, the rotor comprising:
   a plurality of pole teeth, each carrying a field winding;
   a slot formed between each pair of adjacent pole teeth, such that for each slot, the field windings carried by a respective pair of adjacent pole teeth extends into that slot;
   a slot wedge arranged in each slot; and
   a separator arranged in each slot, the separator including two limbs each extending between the slot wedge and each of the respective field windings in the respective slot;
   wherein the separator arranged in each slot (a) extends a generally radial direction from a respective slot wedge arranged in that slot toward a slot base and (b) extends between the field windings carried by the pair of adjacent pole teeth associated with that slot.

2. The rotor of claim 1, wherein each separator is formed from a non-magnetizable, electrically insulating material.

3. The rotor of claim 1, wherein each separator is formed from a plastic.

4. The rotor of claim 1, wherein each separator has a V shaped cross section.

5. The rotor of claim 1, wherein each separator is under prestress and press against the respective field winding in at least one contact-pressure region.

6. The rotor of claim 1, wherein each separator physically separates and electrically isolates the slot wedge from the field windings in the respective slot.

7. The rotor of claim 1, wherein each field winding is surrounded by a potting compound.

8. The rotor of claim 7, wherein the potting compound is also provided in a cavity defined between the slot wedge and the separator in each slot.

9. The rotor of claim 7, wherein a cavity defined between the slot wedge and the separator in each slot is free of the potting compound.

10. The rotor of claim 1, wherein each field winding is surrounded by an impregnating compound.

11. An electric motor, comprising:
    a rotor comprising:
    a plurality of pole teeth, each carrying a field winding;
    a slot formed between each pair of adjacent pole teeth, such that for each slot, the field windings carried by a respective pair of adjacent pole teeth extends into that slot;
    a slot wedge arranged in each slot; and
    a separator arranged in each slot, the separator including two limbs each extending between the slot wedge and each of the respective field windings in the respective slot, insulating the slot wedge from the field windings;
    wherein the separator arranged in each slot (a) extends a generally radial direction from a respective slot wedge arranged in that slot toward a slot base and (b) extends between the field windings carried by the pair of adjacent pole teeth associated with that slot.

12. The electric motor of claim 11, wherein each separator of the rotor is formed from a non-magnetizable, electrically insulating material.

13. The electric motor of claim 11, wherein each separator of the rotor is formed from a plastic.

14. The electric motor of claim 11, wherein each separator of the rotor has a V shaped cross section.

15. The electric motor of claim 11, wherein each separator of the rotor is under prestress and press against the respective field winding in at least one contact-pressure region.

16. The electric motor of claim 11, wherein each separator of the rotor physically separates and electrically isolates the slot wedge from the field windings in the respective slot.

17. The electric motor of claim 11, wherein each field winding of the rotor is surrounded by a potting compound.

18. The electric motor of claim 17, wherein the potting compound is also provided in a cavity defined between the slot wedge and the separator in each slot of the rotor.

19. The electric motor of claim 17, wherein a cavity defined between the slot wedge and the separator in each slot is free of the potting compound.

20. The electric motor of claim 11, wherein each field winding of the rotor is surrounded by an impregnating compound.

\* \* \* \* \*